(12) United States Patent
Yang

(10) Patent No.: US 6,297,808 B1
(45) Date of Patent: *Oct. 2, 2001

(54) CONTROLLER DEVICE INCLUDING AT LEAST ONE FINGER HOLE, A TRACKBALL, AND A DISPLAY SCREEN

(76) Inventor: Tai-Her Yang, No. 32 Lane 29, Taipin St., Si-Hu Town, Dzan-Hwa (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,596

(22) Filed: Mar. 3, 1998

(51) Int. Cl.[7] ................................................ G09G 5/00
(52) U.S. Cl. ................................................... 345/167
(58) Field of Search ................................. 345/156, 157, 345/167, 8, 7

(56) References Cited

U.S. PATENT DOCUMENTS

| | | | |
|---|---|---|---|
| 4,954,817 | * 9/1990 | Levine | 340/706 |
| 5,177,834 | * 1/1993 | Crist | 16/125 |
| 5,267,181 | * 11/1993 | George | 364/708 |
| 5,355,147 | * 10/1994 | Lear | 345/156 |
| 5,481,265 | * 1/1996 | Russell | 345/157 |
| 5,506,605 | * 4/1996 | Paley | 345/163 |
| 5,706,026 | * 1/1998 | Kent et al. | 345/156 |
| 5,725,538 | * 3/1998 | Green et al. | 606/143 |
| 5,740,037 | * 4/1998 | McCann et al. | 345/348 |
| 5,901,222 |   5/1999 | Macor . | |
| 5,999,166 | * 12/1999 | Rangan | 345/157 |

* cited by examiner

Primary Examiner—Almis R. Jankus
(74) Attorney, Agent, or Firm—Bacon & Thomas

(57) ABSTRACT

A hand controller device includes a casing on the outside of which are positioned a finger hole, a track ball, a display screen, and an interface, and on the interior of which are batteries and any other necessary circuitry, depending on the function of the controller. The casing includes one or more finger holes so that the device can be worn like a ring.

13 Claims, 5 Drawing Sheets

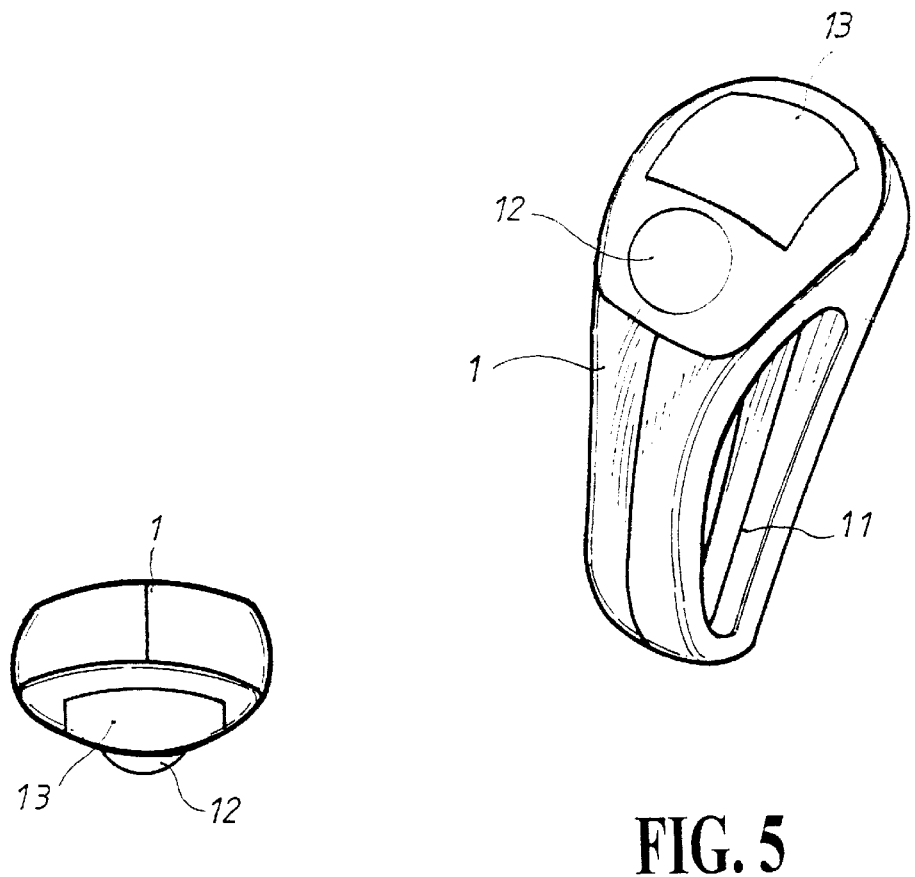
FIG. 5
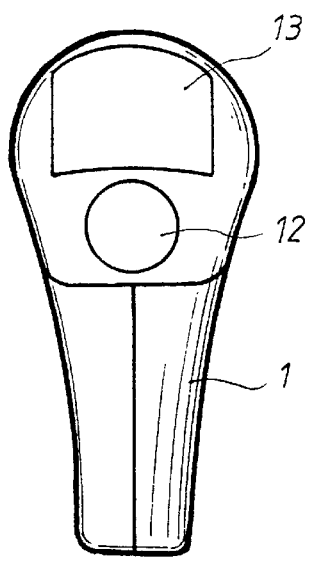
FIG. 6
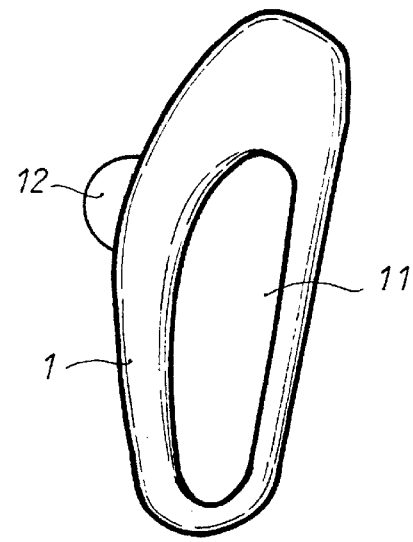
FIG. 8   FIG. 7

CONTROLLER DEVICE INCLUDING AT LEAST ONE FINGER HOLE, A TRACKBALL, AND A DISPLAY SCREEN

BACKGROUND OF THE INVENTION

1. Field of the Invention

It is an innovative structural design related to a holding ring type hand controller device, wherein it is comprised of that the surface of its casing body is installed with a control ball, a display screen and a selectable interface device, in addition the said casing body is further traversely penetrated with one or more than one ring type finger holding holes, as well as its inside is combined with the installation of functional circuits constituted by batteries and electrical or electronic circuits or relevant softwares according to functional requirements.

2. Description of the Prior Art

Casing structures of the conventional hand held controller devices such as remote controllers, hand game players, hand held electronic counter devices or other hand held man-machine interface controller device are designed to match for human hand holding, wherein they have a larger bulky volume and worse controllability.

SUMMARY OF THE INVENTION

The primary purpose of the invention is to provide an innovative structural design of a holding ring type hand controller device, wherein casing of the said device is traversely penetrated with one or more than one ring type holding finger holes, while the outside of the said casing body is installed with a control ball for producing digital or analog signals and a display screen, further, the selectable interface devices can be optionally installed according to functional requirements which include 1) Switches 2) indicating lights 3) speaker 4) timer 5) counter, etc. Wherein one or more than one of them is interacted with the digital or analog signals and the display screen, while its inside is installed with a functional circuit constituted by batteries, electrical or electronic circuits or relevant softwares according to functional requirements for matching with the digital or analog signals produced by the main control ball and correspondingly to drive the display screen, thereby to constitute the various function cycles of the holding ring type hand controller device of the subject case.

The secondary purpose of the invention is to provide an innovative structural design on the holding ring type hand controller device, wherein the said main control ball can be further made to have push button on/off function or cross operated toggle switch function at the same time, whereof the relationships between the said main control ball or cross switch includes the resistance type, capacitor type, photo type, pulse or encoding type, etc. or further to include the finger agitating but non-mechanical translation detecting type detector devices such as induction type, pressure sensing type, photo type, variable resistance type, or variable capacitor types, etc.

BRIEF DESCRIPTION OF THE DRAWINGS

FIG. 5 is a 3-D assembly drawing of the second embodied example.

FIG. 6 is the top view of FIG. 5.

FIG. 7 is the side view of FIG. 5.

FIG. 8 is the front view of FIG. 5.

DETAILED DESCRIPTION OF THE PREFERRED EMBODIMENTS

Figure 1:
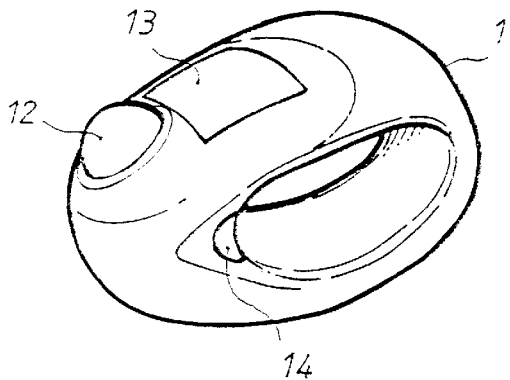
FIG. 1 is a 3-D assembly drawing of the first embodied example of the invention.
Figure 2:
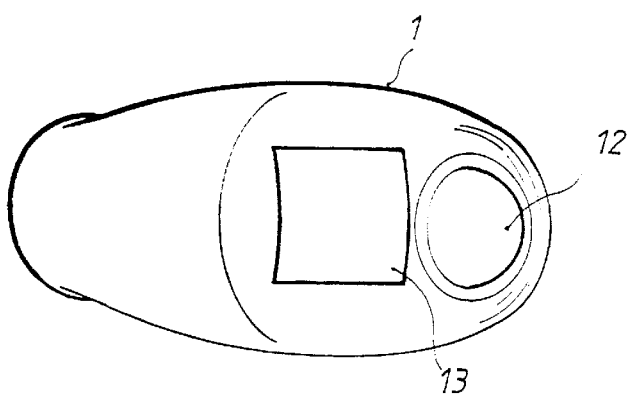
FIG. 2 is the top view of FIG. 1.
Figure 4:
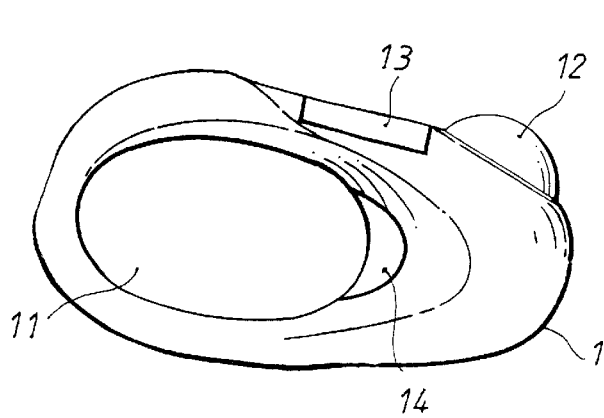
FIG. 4 is the front view of FIG. 1.
Figure 3:
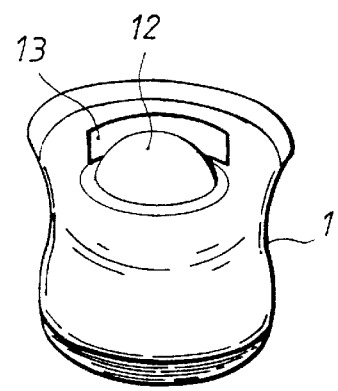
FIG. 3 is the side view of FIG. 1.
Figure 9:
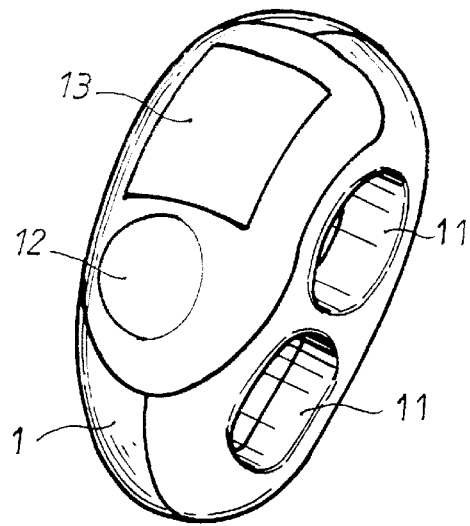
FIG. 9 is a 3-D assembly drawing of the third embodied example.
Figure 10:
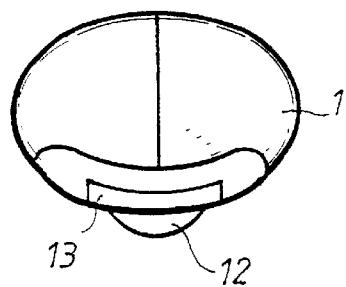
FIG. 10 is the top view of FIG. 9.
Figure 12:
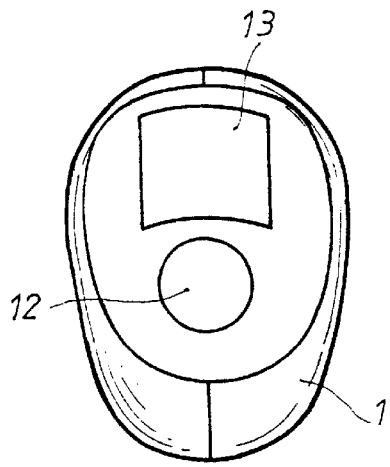
FIG. 12 is the front view of FIG. 9.
Figure 11:
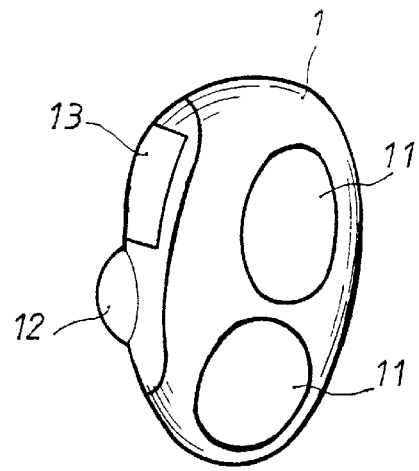
FIG. 11 is the side view of FIG. 9.
Figure 13:
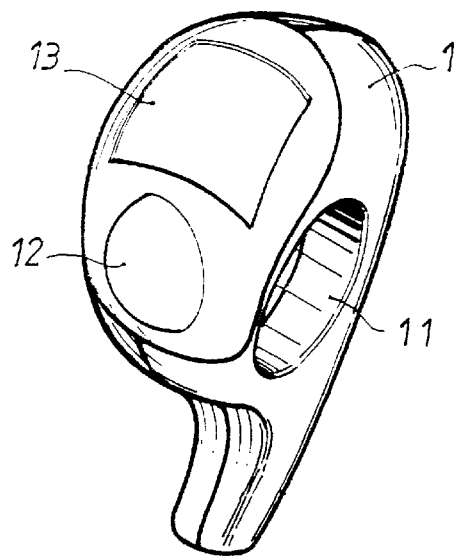
FIG. 13 is a 3-D assembly drawing of the fourth embodied example.
Figure 14:
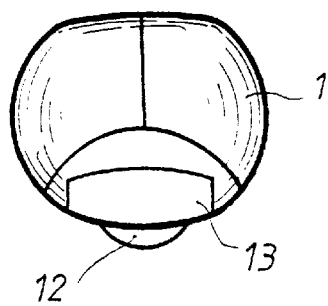
FIG. 14 is the top view of FIG. 13.
Figure 16:
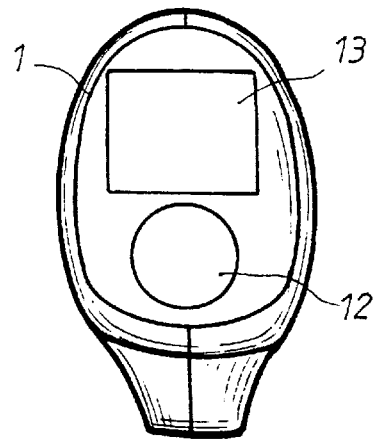
FIG. 16 is the front view of FIG. 13.
Figure 15:
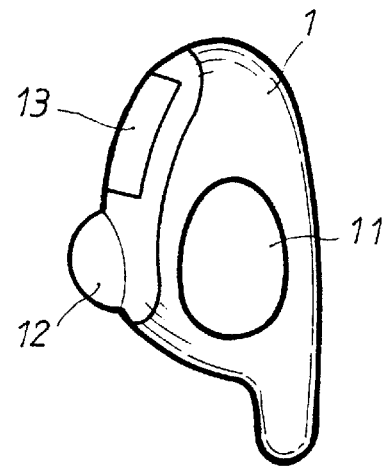
FIG. 15 is the side view of FIG. 13.

As reference to the first embodying examples illustrated in FIGS. 1 to 4 which are the first embodying example of the improvement on the casing 1 of the subject case, wherein it is mainly that the casing body 1 is traversely penetrated with a finger holding hole 11 suitable for finger insertion and holding, and the surface of casing 1 is further installed with an active rolling ball 12, display screen 13 and an optional interface device 14, whereby the said active rolling ball 12 and the display screen 13 are used to produce digital or analog signals, in addition, the traversely penetrated finger holding hole 11 of the said casing can be principally presented in one or more than one penetrated holes for single finger or multiple fingers insertion; furthermore, the optional interface device 14 at the outside of the said casing 1 can be further optionally installed according to functional requirements including 1) Switches 2) indicating lights 3) speaker 4) timer 5) counter, etc. wherein one or more than one of them is interacted with the digital or analog signals produced by the main control ball 12 and the display screen 13, while its inside is installed with a functional circuit constituted by batteries, electrical or electronic circuits or relevant softwares according to functional requirements for matching with the digital or analog signals produced by the main control ball 12 and correspondingly to drive the display screen 13, thereby to constitute the various function cycles of the holding ring type hand controller device of the subject case.

The aforesaid main control ball 12 can be further made to have push button on/off function or cross operated toggle switch function at the same time, whereof the relationships between the said main control ball or cross switch includes the resistance type, capacitor type, photo type, pulse or encoding type, etc. or further to include the finger agitating but non-mechanical translation detecting type detector devices such as induction type, pressure sensing type, photo type, variable resistance type, or variable capacitor types, etc.

Besides, adequate design changes can be made for the neighboring positions of the optional interface devices 14 such as the active control ball 12, display screen 13 and 1) Switches 2) indicating lights 3) speaker 4) timer 5) counter, etc. Wherein it does not need to be limited to only one kind such as that FIGS. 5 to 8, FIGS. 9 to 12 or FIGS. 13 to 16 are all embodying examples with different appearances, i.e.

as long as the random design change of neighboring positions, it is still an application of equivalent operations.

Figure 17:
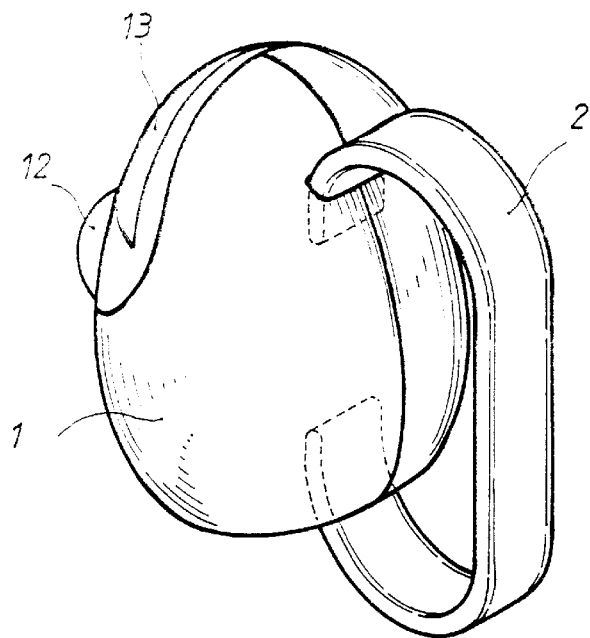
FIG. 17 is a 3-D assembly drawing of the fifth embodied example.
Figure 18:
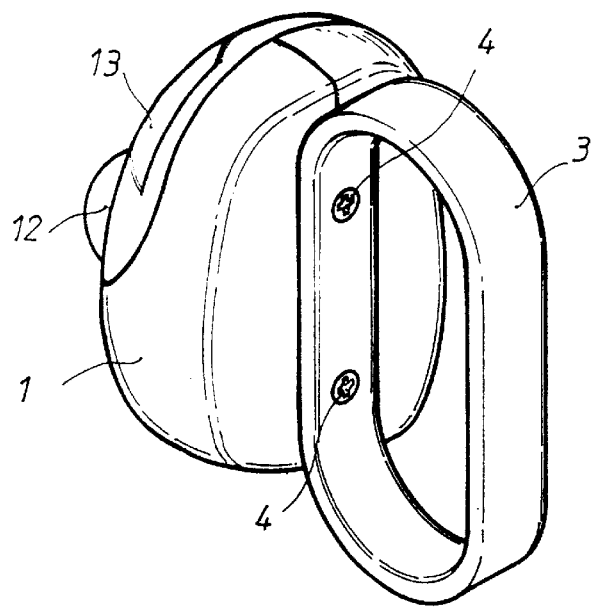
FIG. 18 is a 3-D assembly drawing of the sixth embodied example.

Besides of the various embodying examples, and as according to the spirit of the invention, the said handle or ring type structure and casing can be assembled by one or more than two individual components made of the same material or different materials. In addition, the said casing 1 can be inlayed or lock fixed with a spring force ring shape handle 2 as shown in FIG. 17 or a closed circular ring shape handle 3 (as shown in FIG. 18); i.e. as according to the embodying example shown in FIG. 17, the spring force ring shape handle 2 is by utilizing the two corresponding inlaying slots of the casing body for inlaying assembly, thereby to allow the said spring force ring shape handle 2 suitable for single hand holding operation in the air; and as according to the embodying example in FIG. 18, one side of the closed circular ring shape handle 3 is lock fixed with screw bolts on the back of the casing body (or one side of the closed circular ring shape handle is clamped and lock fixed inside the casing body), thereby to obtain the same effect of single hand holding operation in the air.

As summarized from the above descriptions, the invention is aimed at improving the structure types of the casing body 1 of the holding ring type hand controller device, wherein it is innovative to have the traversely penetrated finger holding holes to allow for single hand holding, and while in holding, the active rolling ball can be agitated by finger to do control operations, therefore, holding method of the subject innovative design on the man-machine interface embodying types is much more convenient than the conventional ones.

What is claimed is:

1. A holding ring type hand controller device, comprising:
   a casing body having an interior and an exterior;
   on the exterior of the casing body, a trackball and a display screen, at least said trackball being arranged to generate electrical signals;
   on the interior of the casing body, circuitry connected to receive said electrical signals; and
   at least one finger hole extending transversely through said casing, said at least one finger hole being arranged to fit over at least two fingers to permit said controller device to be worn on said at least two fingers.

2. A controller device as claimed in claim 1, further comprising an interface responsive to said electrical signals.

3. A controller device as claimed in claim 2, wherein said interface is selected from the group consisting of a switch, an indicating light, a speaker, a timer, and a counter.

4. A controller device as claimed in claim 1, wherein said display screen is also arranged to generate electrical signals.

5. A controller device as claimed in claim 1, wherein said trackball is arranged to perform a push button on/off or toggle function.

6. A controller device as claimed in claim 1, further comprising a detector arranged to detect movement of said trackball and thereby generate said electrical signals.

7. A controller device as claimed in claim 1, wherein said circuitry further includes a power source.

8. A controller device as claimed in claim 1, wherein said power source includes at least one battery.

9. A controller device as claimed in claim 1, wherein said casing includes at least two components.

10. A controller device as claimed in claim 9, wherein said casing includes two slots in which are fitted ends of a handle, said ends of the handle being held in said slots by spring force to form said at least one finger hole.

11. A controller device as claimed in claim 9, wherein said casing includes a main body and a handle, said handle being fixed on said main body by screw bolts to form said at least one finger hole.

12. A controller device as claimed in claim 1, wherein said at least one finger hole includes a single finger hole wide enough to accommodate at least two fingers.

13. A controller device as claimed in claim 1, wherein said at least one finger hole includes two finger holes, each of which accommodates a single respective finger.

* * * * *